(12) United States Patent
Braun et al.

(10) Patent No.: US 8,275,231 B2
(45) Date of Patent: Sep. 25, 2012

(54) OPTICAL WAVEGUIDE

(75) Inventors: Gilbert Braun, Herzogenrath (DE); Volker Ertle, Hattingen (DE); Christian Henke, Mülheim an der Ruhr (DE); Gülsen Kisaboyun, Gladbeck (DE); Andreas Pahl, Düsseldorf (DE); Bernd Prade, Mülheim (DE); Uwe Scheuer, Mülheim (DE); Wolfgang Stammen, Oberhausen (DE); Edmund Zastrozny, Essen (DE)

(73) Assignee: Siemens Aktiengesellschaft, München (DE)

( * ) Notice: Subject to any disclaimer, the term of this patent is extended or adjusted under 35 U.S.C. 154(b) by 547 days.

(21) Appl. No.: 12/310,411

(22) PCT Filed: Aug. 16, 2007

(86) PCT No.: PCT/EP2007/058498
§ 371 (c)(1),
(2), (4) Date: Jul. 16, 2009

(87) PCT Pub. No.: WO2008/022959
PCT Pub. Date: Feb. 28, 2008

(65) Prior Publication Data
US 2010/0046073 A1 Feb. 25, 2010

(30) Foreign Application Priority Data

Aug. 24, 2006 (EP) .................................. 06017646

(51) Int. Cl.
*G02B 6/10* (2006.01)
*G02B 6/00* (2006.01)
*G02B 6/32* (2006.01)
(52) U.S. Cl. ........................ 385/146; 385/35; 385/147
(58) Field of Classification Search .................... 385/35, 385/100, 146, 147
See application file for complete search history.

(56) References Cited

U.S. PATENT DOCUMENTS

| 4,632,505 A * | 12/1986 | Allsworth ........................ 385/61 |
| 7,006,728 B1 * | 2/2006 | Jiang et al. ...................... 385/35 |
| 7,911,673 B1 * | 3/2011 | Yap ................................ 359/242 |

FOREIGN PATENT DOCUMENTS

| DE | 38 23 494 A1 | 1/1990 |
| EP | 0 425 229 A1 | 5/1991 |
| GB | 1 522 610 A1 | 8/1978 |
| JP | 59026702 A | 2/1984 |
| JP | 60177225 A | 9/1985 |

* cited by examiner

*Primary Examiner* — Uyen Chau N Le
*Assistant Examiner* — John M Bedtelyon

(57) ABSTRACT

An optical waveguide with a tubular or hose-like housing is provided, which is used in a high-temperature environment, such as, for example, in a burner. The housing has an input opening, an output opening and a center line extending from the input opening to the output opening. In the interior of the housing, transparent spheres are lined up along with center line. The light is guided on account of the refraction of a light beam upon entering and exiting from the transparent spheres.

16 Claims, 2 Drawing Sheets

OPTICAL WAVEGUIDE

CROSS REFERENCE TO RELATED APPLICATIONS

This application is the US National Stage of International Application No. PCT/EP2007/058498 filed Aug. 16, 2007 and claims the benefit thereof. The International Application claims the benefits of European Patent application No. 06017646.8 EP filed Aug. 24, 2006, both of the applications are incorporated by reference herein in their entirety.

FIELD OF INVENTION

The invention relates to an optical waveguide. It relates especially to an optical waveguide which can be used in burners, e.g. of gas turbine systems.

BACKGROUND OF INVENTION

Optical waveguides have been known per se for a long time. These can, however, usually not be used in a high temperature environment, such as is present in the burner of a gas turbine system for example. The use of optical waveguides in burners of a gas turbine system is of particular interest in order to be able to observe the flame in the gas turbine system. For example, whether ignition has been successful, i.e. a flame has formed or the ignition has to be repeated, can then be optically determined during the ignition process. An optical monitoring of the flame is also useful during operation of the gas turbine system, for example, in order to check the stability of the flame.

SUMMARY OF INVENTION

An object of the invention is therefore to provide a design for an optical waveguide which enables it to be used in a high temperature environment.

A second objective of this invention is to provide a burner, especially for a gas turbine system, which enables the flame to be optically observed.

The objects are achieved by an optical waveguide and by a burner as claimed in the independent claims. The dependent claims contain advantageous embodiments of the invention.

An optical waveguide includes a tubular or hose-like housing which has an input opening, an output opening and an (imaginary) center line extending from the input opening to the output opening. Transparent spheres are lined up along the center line inside the housing. The housing can especially be made of metal. Polished quartz spheres can be used as the spheres.

The construction of the optical waveguide differs in principle from optical waveguides according to prior art, which have a fiber with a low refraction index and a sheath with a higher refraction index surrounding the fiber. The guidance of light in these fibers is based on a total reflection at the boundary surface between the core fiber and the surrounding sheath. Optical waveguides of this kind cannot, however, be readily used in a high temperature environment, such as is present for example in the burner of a gas turbine system. In the optical waveguide the guidance of the light is, on the contrary, not based on a total reflection between a core and a sheath but instead on the refraction of a light beam on entering or exiting from the transparent spheres. The arrangement of spheres in a row furthermore enables the construction of an optical waveguide. An optical waveguide of this kind can also be used in a high temperature environment if the housing and spheres are temperature proof, which, for example, is the case if the housing is made of metal and the spheres are made of polished quartz. The spacing arrangement of the spheres in the housing means that the spheres have an optimum spacing for guiding the light. In the waveguide the housing is designed as a flexible hose or a metal hose. This enables the waveguide to be flexibly guided to its destination.

By means of spacers arranged in the housing between the spheres, it can be ensured that the spheres have a spacing from each other which is optimum for the guidance of the light. The spacers can, for example, be designed as rings fixed to the inside of the housing.

Instead of spacers, there can be a helically wound projection on the inside of the housing, extending from the input opening to the output opening. The spacing of the coils is chosen so that the spheres are located between adjacent coils. This arrangement is advantageous, especially from the point of view of the manufacture of the optical waveguide. The coils in fact enable the spheres to run, while being guided by the coils, in succession into the optical waveguide.

The input opening and/or the output opening of the housing can be closed in the optical waveguide by means of a transparent disk, for example, a quartz disk.

A burner is also provided in which an optical waveguide, which is manufactured from high-temperature resistant material, e.g. metal or quartz, is integrated. A burner of this kind enables the flame to be directly observed from outside the gas turbine, or to be recorded by means of a camera chip, during the operation of the gas turbine.

BRIEF DESCRIPTION OF THE DRAWINGS

Further features, properties and advantages of this invention are given in the following description of exemplary embodiments, with reference to the included drawings.

DETAILED DESCRIPTION OF INVENTION

Figure 1:
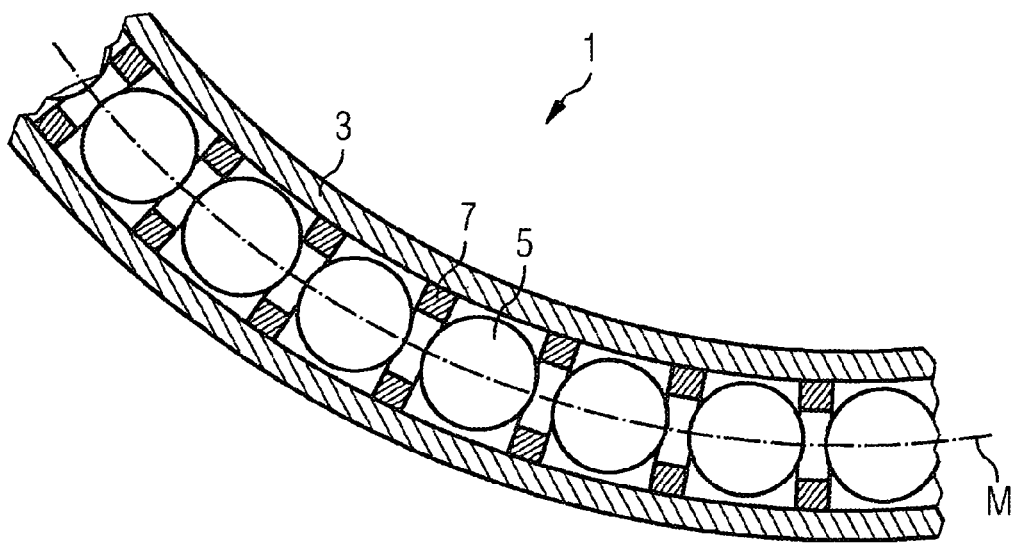
FIG. 1 is a section along the center line of an optical waveguide in accordance with a first exemplary embodiment.
Figure 2:
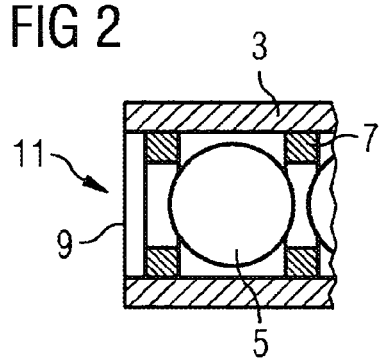
FIG. 2 is one end of the optical waveguide from FIG. 1.

A first exemplary embodiment of the waveguide is shown in FIG. 1. This figure shows a part of the optical waveguide 1 in the form of a section along its center line M. The optical waveguide 1 includes a flexible metal hose 3, which for example can be designed as a convoluted bellows or folded bellows, and a plurality of polished quartz spheres 5, which are arranged in a line along the center line M of the metal hose 3. The quarts spheres 5 are held in position by spacing rings 7 made of metal and attached at regular distances on the inside of the metal hose 3. A quartz sphere 5 is arranged between every two spacers 7. The metal hose 3 has an input opening and an output opening at its ends, which are closed by means of quartz disks 9. An end 11 of the metal hose 3 with a quartz disk 9 is shown in FIG. 2.

Figure 3:
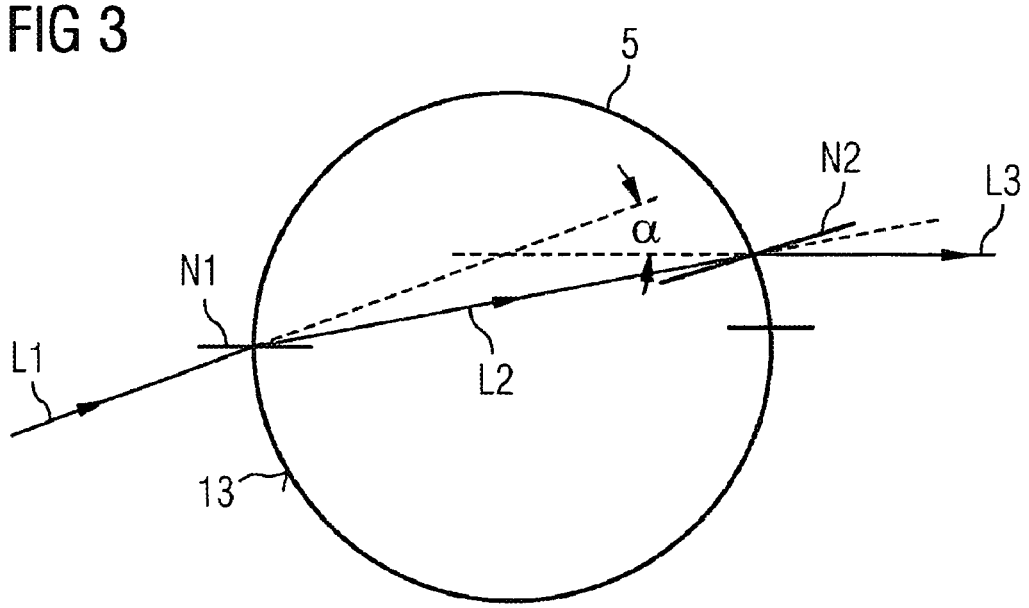
FIG. 3 is a schematic representation to illustrate the optical wave guiding effect in the optical waveguide

In the waveguide 1 shown in FIG. 1, the polished quartz spheres 5 are used to deflect light beams. The deflection is schematically shown in FIG. 3. A light beam L1 striking the surface 13 of a polished quartz sphere 5 when passing through the boundary surface between the air and the quartz material is deflected at the point of passage relative to the surface normal N1. Inside the quartz sphere 5, the light beam L2 extends along a straight line corresponding to a secant of the quartz sphere 5. In other words, the line L2 does not run through the center point of the quartz sphere 5 provided the incoming light beam L1 assumes an angle relative to the surface normal N1 when it strikes the surface 13 of the quartz sphere 5. At the exit point of the light beam L2 from the quartz sphere 5 the light beam is then broken away from the surface normal N2. It exits from the polished quartz sphere 5 as a light beam L3. Because the light beam L1 is refracted twice, it is deflected by the overall angle α from its original direction. Due to the polished quartz spheres 5 being arranged in series, the light beam can thus be guided through the metal hose 3.

Figure 4:
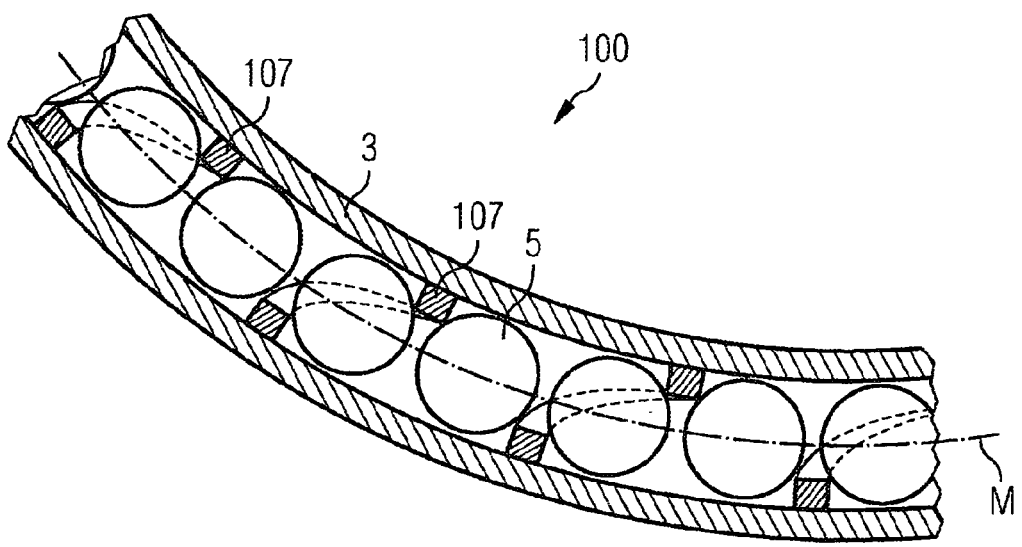
FIG. 4 shows a second exemplary embodiment of the optical waveguide.

A second exemplary embodiment of the optical waveguide 100 is shown in FIG. 4. Elements of the optical waveguide 100 which are identical to elements of the optical waveguide 1 of the first exemplary embodiment are identified by the same reference characters as in FIG. 1 and are not further explained.

The optical waveguide 100 of the second exemplary embodiment differs essentially from the optical waveguide 1 of the first exemplary embodiment in that instead of the spacer rings 7 a helically wound projection 107 is attached to the inside of the metal hose 3. The helically wound projection 107 begins at the input opening of the metal hose 3 and continues up to the output opening. The spaces A between two adjacent coils are chosen in this case so that the quartz spheres 5 can run along the coiled projection 107 through the metal hose. The quartz spheres can then be inserted after the metal hose 3 has been manufactured with a fixed helically wound projection 107 on the inside which thus allows the spheres to run in.

Although flexible metal hoses are used as the optical waveguide in the exemplary embodiments described, other materials can also be used for the housing. For example, a high-temperature resistant ceramic housing material can be used. Although this is not flexible it provides good high-temperature properties. A ceramic housing can, for example, be cast and then fired, which enables considerable freedom with regard to shaping. If a helically wound projection is cast at the same time, the spheres can then be simply inserted into the ceramic housing.

Figure 5:
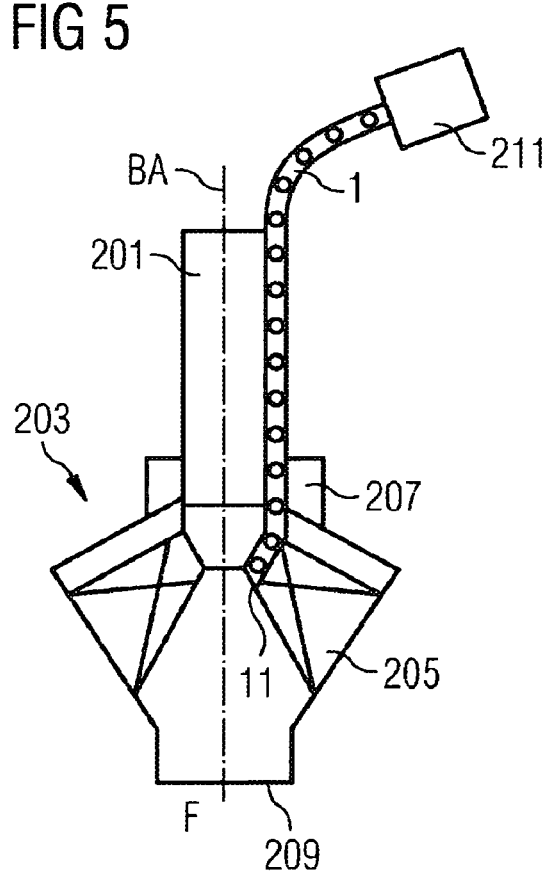
FIG. 5 shows a burner for a gas turbine system with an integrated optical waveguide.

A burner, which is fitted with an optical waveguide, is shown in FIG. 5. The burner is designed as a burner for a gas turbine system but it can, however, also be basically designed as a burner for any combustion plant. In the exemplary embodiment shown in FIG. 5, the burner has a pilot burner 201 which is arranged concentrically relative to a central burner axis BA. Around the pilot burner 201 a main burner 203 is arranged which has an air supply channel 205 and a fuel supply channel 207, which are also arranged in the form of a ring around the pilot burner, for the supply of a liquid or gaseous fuel. The flame F burns downstream of the burner output 209.

In this exemplary embodiment an optical waveguide 1 in accordance with the first exemplary embodiment or the second exemplary embodiment on the outside of the pilot burner 201 is inserted into the air supply channel 205. The end of the optical waveguide 1, arranged in the air supply channel 205, is located so that light beams, which emanate from the flame F, can enter through the quartz disk 9 into the optical waveguide 1. With the aid of the polished quartz spheres, this light is then guided to the outlet of the optical waveguide 1, in which a camera chip 211 is fitted. Just a quartz disk through which the flame can be visually checked or monitored by the optical waveguide 1 can also be fitted at the outlet of the optical waveguide 1 instead of the camera chip.

Although a special burner design has been described with reference to FIG. 5 in this exemplary embodiment, the optical waveguide can also be integrated into any other burner design. The use of the optical waveguide is therefore not limited to the burner design described in FIG. 5.

The invention claimed is:

1. An optical waveguide, comprising:
   a tubular or hose-type housing which has an input opening, an output opening and a center line extending from the input opening to the output opening; and
   a series of transparent spheres in the interior of the housing lined up along the center line, wherein the housing is designed as a flexible hose and the spheres are spaced apart in the housing, and the guidance of the light takes place due to the refraction of a light beam when entering or exiting from the transparent spheres;
   a spacing arrangement extending from the input opening to the output opening which provides a spacing between the spheres, and
   wherein a helically wound projection is present as the spacing arrangement on the inside of the housing extending from the input opening to the output opening, with spacing of coils of the helically wound projection from each other being chosen so that the spheres are located between adjacent coils.

2. The optical waveguide as claimed in claim 1, wherein the housing is made of metal.

3. The optical waveguide as claimed in claim 2, wherein the spheres are polished quartz spheres.

4. The optical waveguide as claimed in claim 1, wherein the spheres are polished quartz spheres.

5. The optical waveguide as claimed in claim 1, wherein the spacing arrangement is established with a series of spacers arranged in the housing between the spheres.

6. The optical waveguide as claimed in claim 5, wherein the spacers are designed as rings fixed to the inside of the housing.

7. The optical waveguide as claimed in claim 1, wherein the input opening and/or output opening is closed by a transparent disk.

8. The optical waveguide as claimed in claim 7, wherein the transparent disk is a quartz disk.

9. A burner, comprising:
   an integral optical waveguide having a tubular or hose-type housing which has an input opening, an output opening and a center line extending from the input opening to the output opening, and transparent spheres in the interior of the housing lined up along the center line, wherein the housing is designed as a flexible hose and the spheres are spaced apart in the housing with a spacing arrangement extending from the input opening to the output opening to provide a spacing between the spheres, and the guidance of the light takes place due to the refraction of a light beam when entering or exiting from the transparent spheres, and
   wherein a helically wound projection is present as the spacing arrangement on the inside of the housing of the integral optical waveguide extending from the input opening to the output opening, with spacing of coils of the helically wound projection from each other being chosen so that the spheres are located between adjacent coils.

10. The burner as claimed in claim 9, wherein the integral optical waveguide is manufactured from a high-temperature resistant material.

11. The burner as claimed in claim 9, wherein the housing of the integral optical waveguide is made of metal.

12. The burner as claimed in claim 9, wherein the spheres of the integral optical waveguide are polished quartz spheres.

13. The burner as claimed in claim 9, wherein the spacing arrangement comprises a series of spacers are arranged in the housing between the spheres of the integral optical waveguide.

14. The burner as claimed in claim 13, wherein the spacers are designed as rings fixed to the inside of the housing.

15. The burner as claimed in claim 9, wherein the input opening and/or output opening of the housing of the integral optical waveguide is closed by a transparent disk.

16. The burner as claimed in claim 15, wherein the transparent disk is a quartz disk.

* * * * *